J. Guttman,

Artificial Teeth.

No. 2,411. Reissued Dec. 4, 1866.

Witnesses:

Jas. E. Lyon

Wm. Trewin

Inventor:

Julius Guttman per Munn & Co.

Attorneys

AM. PHOTO-LITHO. CO. N.Y. (OSBORNE'S PROCESS.)

United States Patent Office.

IMPROVEMENT IN ARTIFICIAL DENTURES.

JULIUS GUTTMAN, OF GREAT FALLS, NEW HAMPSHIRE.

*Letters Patent No.* 52,993, *dated March* 6, 1866; *reissue No.* 2,411, *dated December* 4, 1866.

SPECIFICATION.

TO ALL WHOM IT MAY CONCERN:

Be it known that I, JULIUS GUTTMAN, of Great Falls, in the county of Strafford, and State of New Hampshire, have invented a new and useful Improvement in Artificial Dentures; and I do hereby declare that the following is a full, clear, and exact description thereof, which will enable others skilled in the art to make and use the same, reference being had to the accompanying drawings, forming part of this specification, in which—

Figures 1, 2, 3:
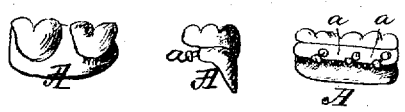

Figure 1 is a front elevation.

Figure 2, a transverse section; and

Figure 3, an inside elevation of teeth made in the usual manner.

Figures 4, 5, 6:
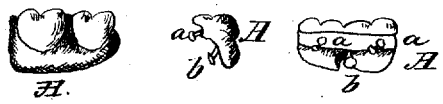

Figures 4, 5, and 6 are similar views of my improved denture before it is finished.

Figures 7, 8, 9:
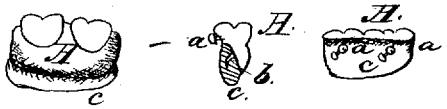

Figures 7, 8, and 9 are similar views of the same when finished.

Similar letters of reference indicate like parts.

This invention relates to an improvement in the manufacture of porcelain teeth for under sets, which consists in the application of one or more extra pins below the pins generally used for the attachment of the rubber, said extra pins being placed so as to form a zigzag line with the ordinary pins in such a manner that by casting on or otherwise attaching to said extra pin or pins a piece of metal the weight of each tooth or of the denture is increased, and the same is rendered less liable to being displaced than dentures made in the usual manner.

A represents a portion of a denture made in the usual manner with a series of pins, *a*, intended for the attachment of the rubber. Below these pins, and so as to form a zigzag line with the same, I insert one or more pins, *b*, either in a rectangular or in an oblique position, as shown in figs. 5 and 8; and these additional pins I use for the purpose of casting or otherwise securing to the teeth a piece of metal, *c*. This piece of metal increases the weight of the tooth or section of teeth, and prevents in a great measure its liability of being accidentally displaced, and thereby the operation of making up the teeth in sets is materially facilitated, and durable sets can be produced.

What I claim as new, and desire to secure by Letters Patent, is—

1. An artificial tooth, or set of teeth, provided with pins set in a zigzag line, substantially as and for the purpose set forth.

2. Loading sections of artificial teeth previous to making them up in sets, substantially as and for the purpose described.

JULIUS GUTTMAN.

Witnesses:

DANL. M. GOODWIN,

WM. D. KNAPP.